(12) United States Patent
Narasimhan et al.

(10) Patent No.: US 11,316,751 B2
(45) Date of Patent: Apr. 26, 2022

(54) ADAPTIVE LEARNING SYSTEM WITH A PRODUCT CONFIGURATION ENGINE

(71) Applicant: PAYPAL, INC., San Jose, CA (US)

(72) Inventors: Srivathsan Narasimhan, San Jose, CA (US); Premkumar Alagarsamy, San Jose, CA (US); Avik Chatterjee, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 155 days.

(21) Appl. No.: 16/659,394

(22) Filed: Oct. 21, 2019

(65) Prior Publication Data

US 2020/0052975 A1 Feb. 13, 2020

Related U.S. Application Data

(62) Division of application No. 15/248,228, filed on Aug. 26, 2016, now Pat. No. 10,454,779.

(51) Int. Cl.
| | |
|---|---|
| *H04L 12/24* | (2006.01) |
| *H04L 41/147* | (2022.01) |
| *G06N 20/00* | (2019.01) |
| *H04L 41/0893* | (2022.01) |
| *H04L 43/0876* | (2022.01) |

(52) U.S. Cl.
CPC .......... *H04L 41/147* (2013.01); *G06N 20/00* (2019.01); *H04L 41/0893* (2013.01); *H04L 43/0876* (2013.01)

(58) Field of Classification Search
CPC ............... H04L 41/147; H04L 41/0893; H04L 43/0876; G06N 20/00

USPC ......................................................... 709/224
See application file for complete search history.

(56) References Cited

U.S. PATENT DOCUMENTS

| | | | | |
|---|---|---|---|---|
| 2005/0240522 | A1* | 10/2005 | Kranzley | G06Q 20/02 705/40 |
| 2007/0192474 | A1* | 8/2007 | Decasper | H04L 67/1078 709/223 |
| 2011/0166997 | A1* | 7/2011 | Dixon | G06Q 20/20 705/41 |
| 2011/0282789 | A1* | 11/2011 | Carroll | H04W 4/021 705/44 |
| 2012/0203689 | A1* | 8/2012 | Parvis | G06Q 40/00 705/39 |
| 2013/0339975 | A1* | 12/2013 | Busaba | G06F 9/50 718/104 |
| 2014/0344153 | A1* | 11/2014 | Raj | G06Q 20/3821 705/44 |

(Continued)

*Primary Examiner* — Meng Vang
(74) *Attorney, Agent, or Firm* — Haynes and Boone, LLP

(57) ABSTRACT

The adaptive learning systems described herein may include machine-learning engines, product configuration engines, and/or various other components configured to improve the efficiency of processing transactions. The systems described herein may detect and/or predict declined transactions, token deficiencies, insufficient system capacities, and/or other system anomalies. As such, the system may perform operations to generate additional tokens associated with assets, provision various bin ranges, and/or share reserve capacities, and/or other operations. Thus, the system may improve system efficiencies, ensure reliability and operability across the system, and optimize the operations for successfully processing transactions.

20 Claims, 11 Drawing Sheets

(56) References Cited

U.S. PATENT DOCUMENTS

| | | | |
|---|---|---|---|
| 2015/0074035 A1* | 3/2015 | Narasappa | G06N 7/005 706/52 |
| 2015/0301510 A1* | 10/2015 | Dull | G05B 13/027 706/23 |
| 2016/0071094 A1* | 3/2016 | Krishnaiah | G06Q 20/308 705/66 |

* cited by examiner

ADAPTIVE LEARNING SYSTEM WITH A PRODUCT CONFIGURATION ENGINE

CROSS-REFERENCE TO RELATED APPLICATIONS

This application is a divisional of U.S. patent application Ser. No. 15/248,228, filed Aug. 26, 2016, which is herein incorporated by reference in its entirety.

BACKGROUND

The present invention generally relates to machine learning, particularly with product configuration engines for electronic data processing.

Processing a transaction generally involves the movement of assets. In some respects, the movement of the assets may vary based on the entities involved, the one or more types of transactions required by the movement, and/or the various instruments available, among other potential attributes. Further, the movement may be characterized based on the sources and/or sinks of the movement, various regional regulations, multiple currencies that may be involved in the movement, and/or the types of assets such as the products associated with the movement, among other attributes as well. In some instances, numerous attributes may be determined to qualify the movement internally and externally from the perspective of a participating entity involved in the transaction.

In various circumstances, the number of records maintained by hardware processors, memories, and/or data storage components may proportionally increase to thousands, millions, and/or possibly billions of fields, potentially based on the increasing number of attributes described above. Thus, in some instances, numerous fields may be associated with a simple transaction such that, for example, each of the participating entities involved may provide their respective approvals. Further, the numerous fields clustered with the transaction may create a number of system inefficiencies. Thus, as demonstrated in the scenarios above, there may be various inefficiencies associated with systems that handle larger volumes of fields associated with transactions. Further, it may be required to reduce and/or eliminate the latency involved with processing the transactions based on user experience requirements, service level agreements, and/or market demands and costs, among other possible factors.

As such, there is much need for technological advancements in various aspects of computer technology in the realm of computer networks and particularly with systems associated with transactions to optimize the management of data amongst the participating entities to improve system performance and efficiency.

Figure 1A:
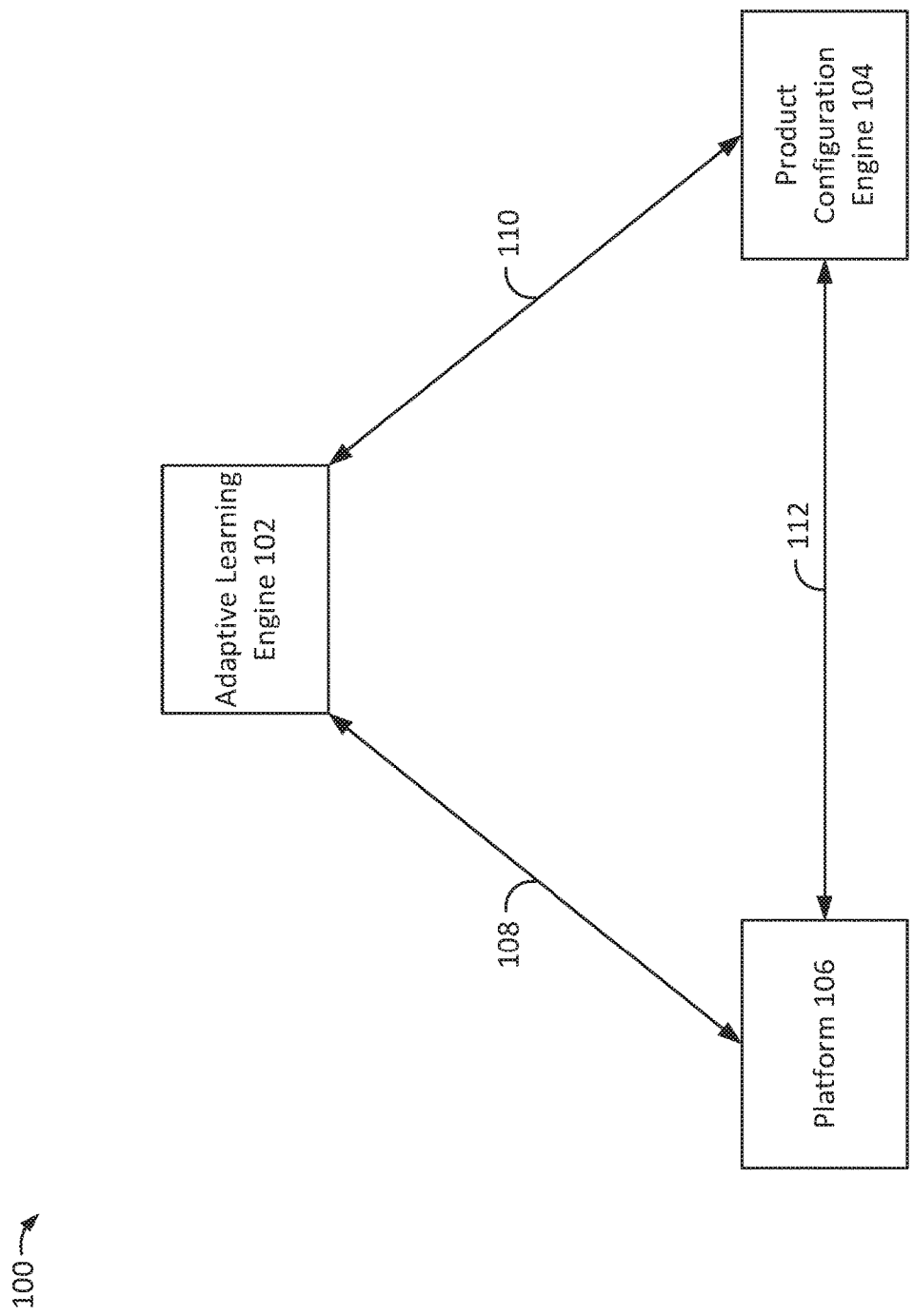
FIG. 1A illustrates an exemplary system, according to an embodiment.

Embodiments of the present disclosure and their advantages may be understood by referring to the detailed description herein. It should be appreciated that reference numerals may be used to illustrate various elements and features provided in the figures. The figures may illustrate various examples for purposes of illustration and explanation related to the embodiments of the present disclosure and not for purposes of any limitation.

DETAILED DESCRIPTION

As described above, there may be various inefficiencies associated with systems that handle a larger number of fields associated with transactions. Yet, there may also be an increasing number of complexities associated with the transactions, including intricate assets such as various types of products, changes in time domains, and/or the number of currencies involved, among the number of possible attributes, as similarly described above. Thus, the requirement to reduce and/or eliminate the latency involved with processing the transactions may be even more challenging.

In view of the circumstances above, an adaptive learning system with a product configuration engine is described herein. The system may be configured to consolidate attributes of the transactions, unify the structures of the transactions, and/or reduce the complexities described above, among various other operations described herein to improve the system performance and efficiencies. Thus, the system may be scalable for further requirements, thereby creating a product modeling system sustainable for numerous attributes that may be added and/or removed.

For example, in some instances, the system may be configured to manage token issuances. Examples of such tokens may include network tokens, transfer tokens, payment tokens, identity tokens, and/or various types of tokens that identify assets, possibly uniquely identifying such assets, where the assets including resources, limited resources, and/or scarce resources, among other possibilities. In some instances, the tokens may be issued from particular bins, possibly based on the frequency of tokens issued. Further, the bin ranges associated with a pool of tokens may deplete at faster rates than expected and/or projected by the system. As such, the system may determine the number of tokens in the bin ranges. Further, based on analyzing the token depletion rate, the system may provision one or more additional bin ranges to generate more tokens, thereby eliminating potential token deficiencies that may cause transaction to be declined. Thus, the system operates proactively to eliminate the deficiencies and related latencies involved with waiting for provisioning bin ranges and issuing tokens based on token deficiencies. Yet further, the system eliminates the possibility of human errors involved with provisioning the bin ranges, generating the tokens, and/or other actions associated with token management. Notably, in some instances, the bin, as described herein, may refer to a bank identification number and/or a "BIN." For example, the bin may be related to the International Organization for Standardization (ISO), such as the ISO/IEC 7812, part 1, that corresponds to the numbering systems. Yet further, the bin, as described herein, may also refer to an issuer identification number and/or an "IIN," possibly represented by six digits that may also indicate the major industry identifier, where the IIN may identify the issuing organization.

Notably, consider one scenario in which a user's transaction is declined based on a deficiency in the number of tokens available for transactions. In such a scenario, the system described herein is configured to proactively prevent the transaction from being declined based on the system detecting the number of tokens available at any given time and also the token depletion rate associated with the on-going transactions. As noted, the system is able to predict the possibility of a token deficiency based on the number of tokens assigned or issued over the number of tokens generated in a given time period. As such, the user transaction may be processed without any declining errors. In various such ways, the end users may be directly affected by the system's ability and optimization of managing tokens.

In some embodiments, the system may process feedback data from the adaptive learning engine to perform one or more operations. In some instances, the system generates an intermediate matrix that represents various policy requirements, such as the attributes of the transactions described above. The intermediate matrix may represent the policy requirements in binary form, possibly based on the feedback data from the adaptive learning engine. In some instances, the intermediate matrix may be used to perform matrix operations to modify product-policy data stored in the system. In some instances, the product-policy data may represent one or more assets, such as one or more products, and various policies associated with the assets and/or products, possibly where the policies include various restrictions and/or constraints on transactions associated with the assets and/or products. Thus, the system may be able to learn various policy requirements based on the feedback data from the adaptive learning engine and implement modifications to reduce the number of records maintained, reduce delays and/or latencies involved with system maintenance, and further reduce human interactions with the system, among other possible sources of inefficiencies.

In some embodiments, the system may enhance authentications with online transactions. For example, consider a scenario in which the system detects a number of transactions being declined, possibly based on various instruments associated with a particular issuing system referred to herein as an issuer. In particular, the system may detect one or more indications of anomalies based on the number of transactions declined, potentially detecting a temporary increase in the number of transactions declined, the types of transactions declined, insufficient system capacities to process the transactions, and/or the conditions on the system related to the transactions declined, among other possible indications of the anomalies. In such instances, the system may be configured to notify system administrators, possibly displaying notifications on one or more mobile devices of the administrators. Further, the system may modify various policy requirements, potentially with the intermediate matrix described above. As such, the system may enable the transactions to be processed based on the various modifications implemented, thereby reducing delays and/or latencies, the number of records maintained, and further various steps for the system to reattempt and/or reprocess the declined transactions.

In some embodiments, the system may also be configured to share transactional capacities. For example, in some instances, the capacity to process transactions may vary based on a given period of time. Further, the system may determine the operating capacity of the system required to process the transactions over the given period of time. Yet further, the system may determine a reserve capacity that may be available based on the operating capacity during the given period of time. For example, in some instances, the reserve capacity may be determined based on the feedback data from the adaptive learning engine. Further, the system may identify a number of system sites that require additional capacity. As such, the system may share the reserve capacity with the sites that require the additional capacity. Thus, the system may efficiently allocate its capacities to ensure operability across various other sites and/or networks.

FIG. 1A illustrates an exemplary system 100, according to an embodiment. As shown, the system 100 may include an adaptive learning engine (ALE) 102, a product configuration engine (PCE) 104, and a platform 106. Further, there may be a connection 108 between the ALE 102 and the platform 106, a connection 110 between the ALE 102 and the PCE 104, and a connection 112 between the PCE 104 and the platform 106.

In some embodiments, the ALE 102 may be a self-learning engine. In particular, the ALE 102 may learn and/or develop a number of rules based on data retrieved from the connections 108 and/or 110 from platform 106 and/or the PCE 104, respectively. Further, the ALE 102 may perform machine learning based on various self-learning mechanisms associated with detecting network anomalies, such as those described above, and applying a number of intelligent rules. Further, the platform 106 may be used and/or implemented by a provider, such as PayPal, Inc. of San Jose, Calif., USA. The platform 106 may include an activity monitor configured to detect various indications of transactional traffic associated with one or more networks, such as transaction requests transmitted and/or received, and further token traffic associated with the requests. Yet further, the PCE 104 may include various product-policy data entries. In some instances, the product-policy data may be configured automatically based on various actions, such as rule actions and/or manual actions, among other possible actions contemplated herein.

In some embodiments, the ALE 102 may retrieve data from the platform 106 over the connection 108 and develop various asset, product, and/or policy rules. Further, the rules may be transmitted to the PCE 104 over the connection 110. In some instances, the platform 106 may implement various operations based on the product-policy data in the PCE 104. As such, the system 100 may operate in a cyclical manner, where the ALE 102 optimizes the system 100 based on the various self-learning mechanisms associated with detecting the network anomalies, insufficient system capacities to process transactions, and developing the product-policy data.

Figure 1B:
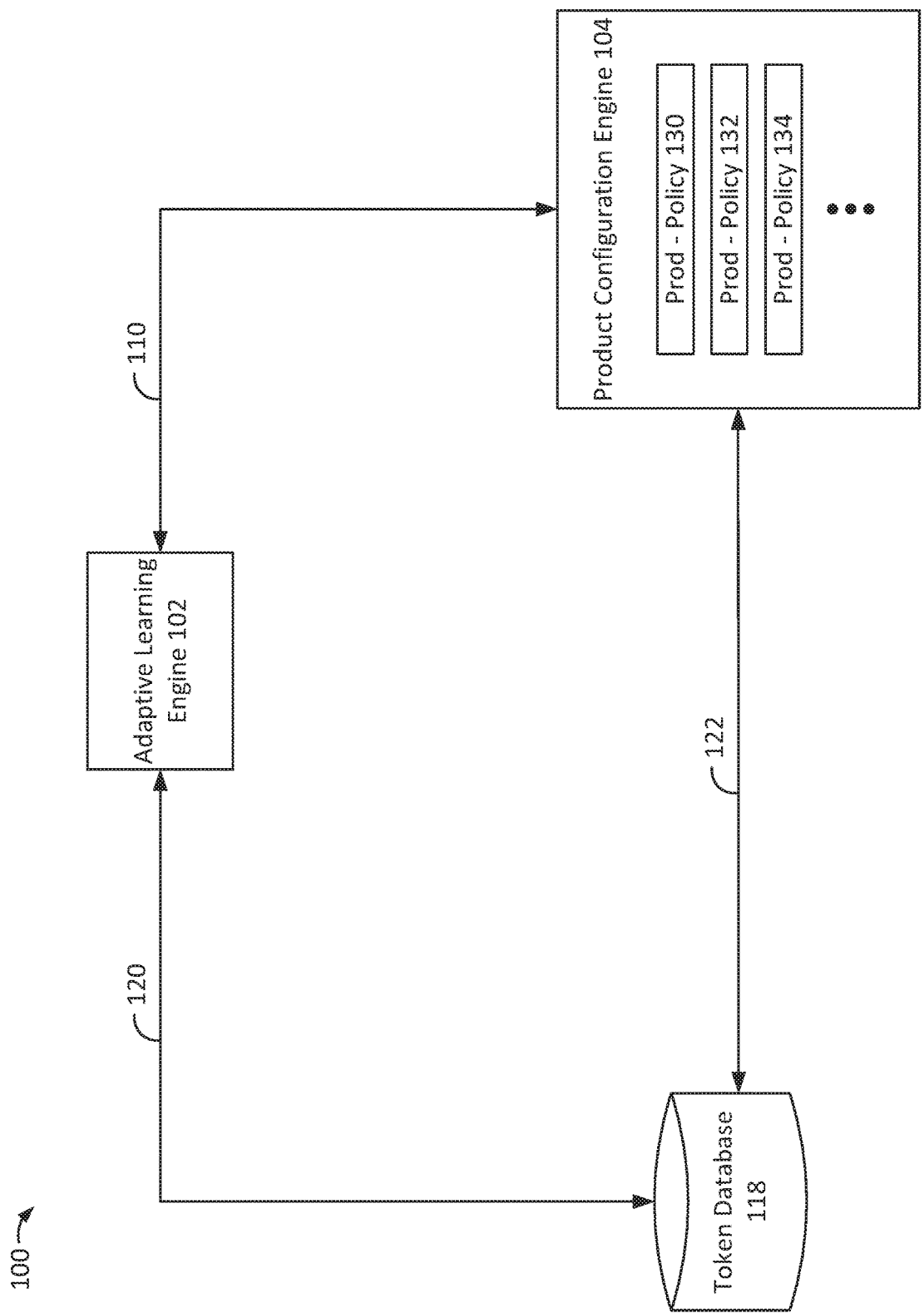
FIG. 1B illustrates the exemplary system with product-policy data, according to an embodiment.

FIG. 1B illustrates the exemplary system 100 with the product-policy data 130, 132, and 134, according to an embodiment. As shown, the system 100 includes the ALE 102, the PCE 104, and the connection 110 between the ALE 102 and the PCE 104, as described above in relation to FIG. 1A. Further, the system 100 includes a token database 118 and a connection 122 between the token database 118 and the PCE 104. Yet further, a connection 120 is shown between the token database 118 and the ALE 102, where the token database 118 may be implemented with the platform 106 described above.

In some embodiments, the system 100 may identify one or more token requests, possibly from the platform 106 described above in relation to FIG. 1A. For example, the token requests identified may correspond with transactions requested by users of the platform 106, possibly a transaction to move the assets described above. In some instances, the system 100 may also determine an indication of token traffic associated with the platform 106, possibly based on the identified token request and/or a group of identified token requests. Further, the system 100 may determine a token depletion rate based on the number of tokens issued in response to the token requests over a given period of time. As such, the system 100 may generate a number of tokens in the token database 118 based on the token depletion rate, possibly to avoid the scenarios described above associated with token deficiencies potentially causing transactions to be declined. Yet further, the system 100 may learn one or more indications of anomalies associated with the transactions requested by users and further cause mobile devices, such as those controlled by system administrators, to display the indications. For example, the indications of the anomalies may include a time of day, a time of the year (e.g., holidays), a number of transactions at a given time period, the entities involved with the transactions, insufficient system capacities to process transactions, and/or various other conditions of the system 100, among others as contemplated above. As such, the system 100 may learn to prevent possibilities of token deficiencies as described above.

Notably, under various circumstances, the system 100 may measure the token depletion rate from the activity monitor provided by the platform 106. Yet, in some instances, the possibility of token deficiencies may be cured as the system 100 generates additional tokens or token identifiers. Further, in some instances, the system 100 may measure the depletion rate of one or more token ranges from the perspective of an issuer and/or an issuer system. As such, the activity monitor of the platform 106 may detect the generation of the tokens to meet, drop below, and/or exceed a token threshold. As such, the adaptive learning engine 102 may activate additional bin ranges for the tokens such that the issuer system may issue token numbers and/or identifiers from the second bin range to avoid the potential deficiencies, possibly resulting in declined transactions.

In some embodiments, the system 100 may also optimize the processing of transactional payloads by identifying the specific elements required for processing the transaction, where the elements may include various attributes of the transaction described above. For example, the system 100 may identify core elements that may be required to move the assets, including various types of products, possibly associated with the transaction. In particular, the core elements may identify the buyer, the seller, and/or the consumer, among other possible entities involved in the transaction. Yet further, the core elements may identify various details of the interactions including the purchase of goods, the services provided, the movement of assets, e.g., money or funds, and/or adding one or more financial instruments identified in a digital wallet. In addition, the core elements may identify the source of the transaction, the type of assets involved in the transaction, and/or the various instruments, e.g., credit cards, debit cards, and/or loan instruments. Yet further, the core elements may indicate the approving entities, such as approving agents, merchants, banks, issuers and/or loan approvers, among other possible entities involved.

In some embodiments, the system 100 may also identify profile elements. For example, the profile elements may indicate a number of decisions and/or actions, such as enabling actions, disabling actions, and/or filtering actions, among other actions contemplated above. Further, the actions may be related to regulatory compliance, card network policies, fraud and/or risk, service provider policies, required entity acceptances, among other possible factors. For example, the enablers may include channel partners, such as in-store merchants. As such, the enabling actions may indicate various transactional processes such as checkout processes, near-field communication (NFC) transactional processes, biometric data (e.g., fingerprint data) authenticated transactional processes, and/or other processes potentially associated with instruments accepted by the merchants. Further, the disablers may indicate compliance rules, such as rules by country, funding type, and/or various markets, among other potential restrictions and/or constraints. Yet further, the filters and/or filtering actions may include various risk rules for the transaction, the funding types, the participating entities, and/or the various markets.

In some embodiments, the system 100 may break down the common product elements to derive a set of the core elements described above. By standardizing and/or normalizing the elements, the system 100 may identify unnecessary elements, remove such elements, and/or eliminate redundancies to improve system efficiency. As such, the system 100 may list the profile elements based on the break down methodology and the standardization and/or normalization processes. Yet further, the system 100 may synthesize the various actions, including the enabling actions, the disabling actions, and/or the filtering actions as well. As such, the system 100 may create and/or manage the product configuration engine 104 to make changes to various elements, such as the core elements and the profile elements described above.

Figure 1C:
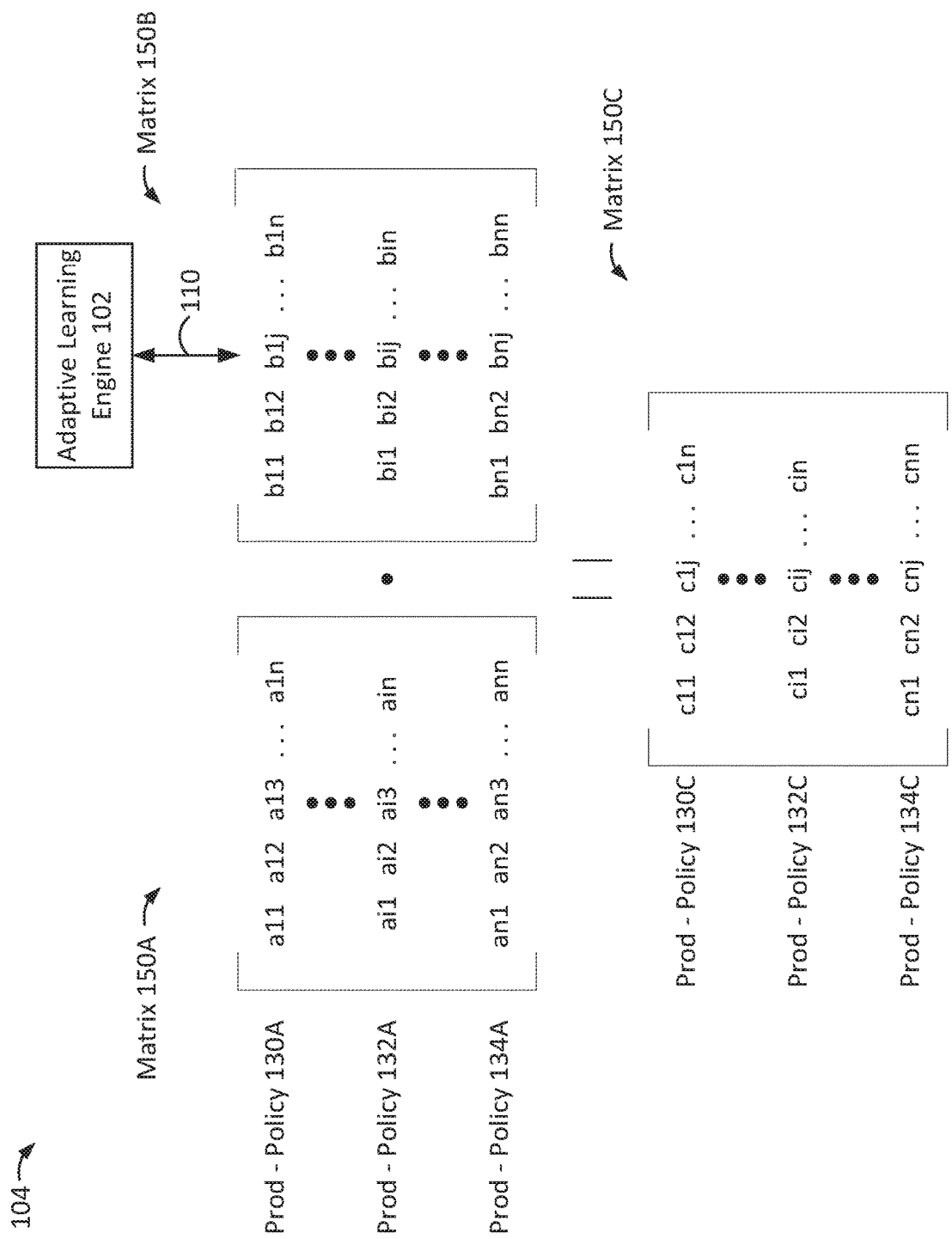
FIG. 1C illustrates an product configuration engine (PCE) with matrices, according to an embodiment.

FIG. 1C illustrates the product configuration engine (PCE) 104 with matrices 150A, 150B, and 150C, according to an embodiment. As noted, the system 100 optimizes various forms of transfer data, such as transaction payloads, by identifying the elements required to process the transactions. As such, the system is capable of avoiding redundancies and/or duplications, thereby saving excess CPU cycles of the system 100 to optimize the system performance and improve system efficiency. Thus, the system 100 may provision a multi-dimensional matrix 150A configured to map core and/or profile elements required in a transaction, potentially based on the products associated with the transaction.

For example, the matrix 150A may be a representation of a number of values associated with the core and/or profile elements. As shown, the matrix 150A is represented with product-policy data 130A in the first row including the data (a11), data (a12), data (a13), and other data contemplated with the ellipses, and further the data (a1n), where the "n" represents the number of columns and the number of rows. Product-policy data 132A corresponds to the second row including the data (ai1), data (ai2), data (ai3), and other data contemplated with the ellipses, and further the data (ain), where "i" indicates the particular row in the matrix 150A. Product-policy data 134A corresponds to the third row including the data (an1), data (an2), data (an3), and other data contemplated with the ellipses, and further the data (ann).

Further, the matrix 150B may also be a multi-dimensional matrix, possibly formed with data from the adaptive learning engine 102 over the connection 110, as described above. The matrix 150B may be a representation of decision actions in one or more policy domains provided in binary form. For example, the value of "1" may indicate that an element is required and the value of "0" may indicate that an element is not required. Thus, the matrix 150B may be made up of 1's and 0's to pass elements required and mask elements that are not required. As shown, the matrix 150B is represented with a first row including the data (b11), data (b12), data (b1j), and other data contemplated with the ellipses, and further the data (bin), where "j" is the any number between 3 and n, and where "n" represents the number of columns and the number of rows. The second row may include the data (bi1), data (bi2), data (bij), and other data contemplated with the ellipses, and further the data (bin), where "i" indicates the particular row in the matrix 150B. The third row may include the data (bn1), data (bn2), data (bnj), and other data contemplated with the ellipses, and further the data (bnn). In some instances, the PCE 104 and/or the ALE 102 may add additional rows and/or columns based on the matrix 150A, possibly to modify the number of rows and/or columns that correspond to the number of rows and/or columns in the matrix 150A. For example, the PCE 104 may add a row to the matrix 150A based on a new policy that that is generated and further, the PCE 104 may remove a row from the matrix 150A based on a policy that that is deleted. Further, the PCE 104 may add a column based on a new domain and/or attribute and further, the PCE 104 may remove a column based on a domain and/or attribute that is deleted, among other possibilities.

In some embodiments, the PCE 104 may perform an operation, such as a multiplication operation, with the matrix 150A and the matrix 150B to provide and/or generate the matrix 150C. As such, the elements that are not required are masked with the "0" based on the matrix operation to derive the matrix 150C, which may include only the elements required to process the transactions, thereby avoiding payload the duplication and redundancies described above. Further, the number of fields or data can be reduced, resulting in less processing cycles and/or power required to process the data associated with the transaction represented by the matrices 150A, 150B, and 150C.

As shown, the matrix 150C is represented with the product-policy data 130C, 132C, and 134C. The matrix 150C is represented with the product-policy data 130C in the first row including the data (c11), data (c12), data (c1j), and other data contemplated with the ellipses, and further the data (cm n), where the "j" is any number between 3 and "n," and "n" represents the number of columns and the number of rows in the matrix 150C. The matrix 150C is represented with the product-policy data 132C in the second row may include the data (ci1), data (ci2), data (cij), and other data contemplated with the ellipses, and further the data (cin), where "i" is the particular row in the matrix 150C. The matrix 150C is represented with the product-policy data 134C in the third row may include the data (cn1), data (cn2), data (cnj), and other data contemplated with the ellipses, and further the data (cnn).

Notably, the matrix 150C also saves processing latency in various orders of magnitude. Further, the matrix 150C may correspond to a name value tuple that is standardized over numerous domains across platforms, such as the platform 106 described above, such that the matrix 150C may be compressed and further interpreted by the various platforms. As such, the various platforms, including the platform 106, may interpret the specific product configurations indicated by the product-policy data 130C-134C based on the matrix 150C. As such, the time, the number of cycles, and/or the power required to provision a product may be exceptionally less than conventional processes.

Figure 2A:
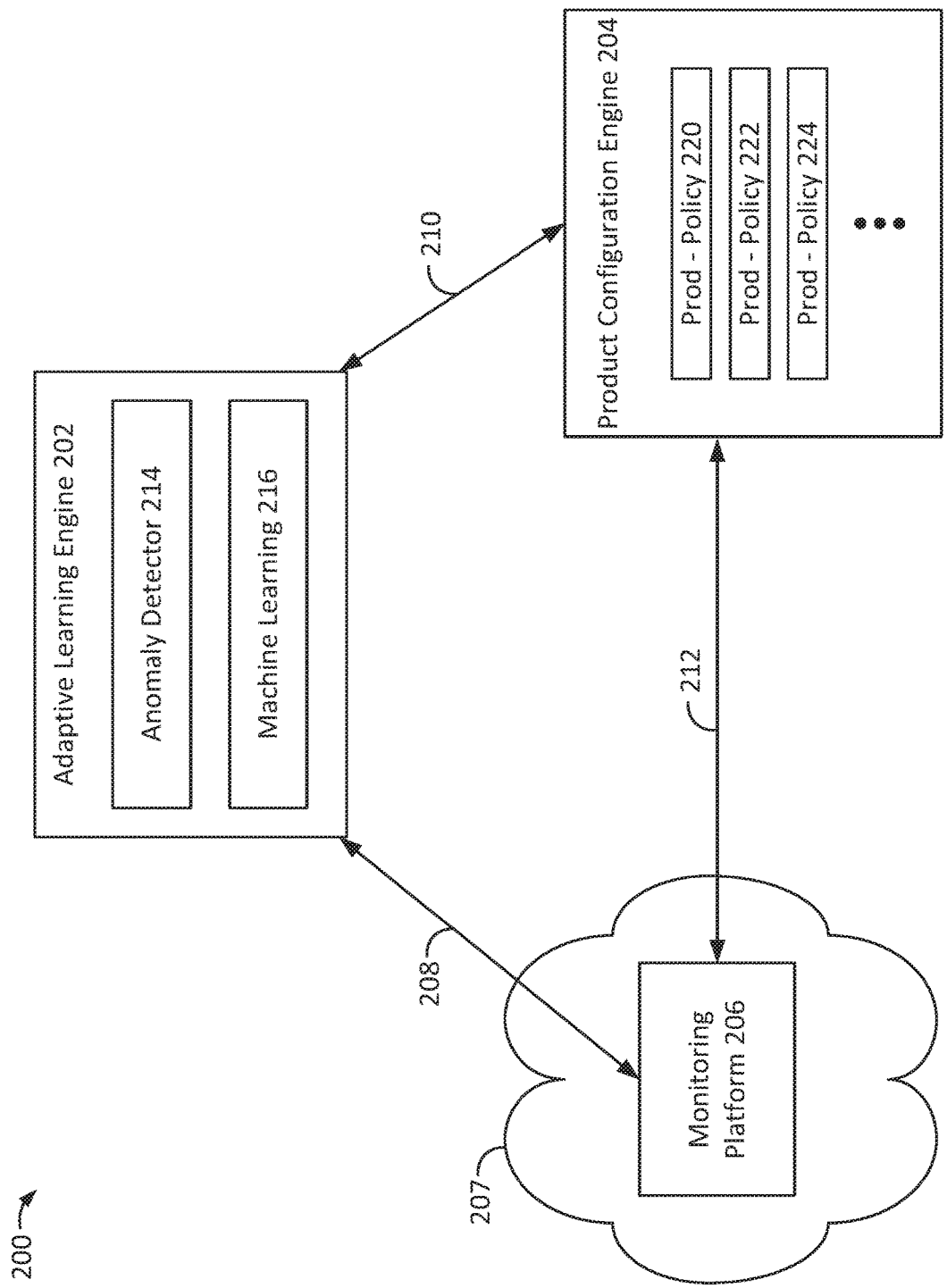
FIG. 2A illustrates an exemplary system, according to an embodiment.

FIG. 2A illustrates an exemplary system 200, according to an embodiment. As shown, the system 200 may include an adaptive learning engine (ALE) 202, a product configuration engine (PCE) 204, a monitoring platform 206, and a network 207. Further, the ALE 202 may include an anomaly detector 214 and a machine learning component 216. Yet further, the PCE 204 may include the product-policy data 220, 222, and/or 224, among other data contemplated with the ellipses. In addition, there may be a connection 208 between the ALE 202 and the platform 206, there may also be a connection 210 between the ALE 202 and the PCE 204, and there may also be a connection 212 between the PCE 204 and the platform 206. Notably, the ALE 202, the PCE 204, the monitoring platform 206, and the connections 208-212 may take the form of ALE 102, the PCE 104, the platform 106, and the connections 108-112, respectively, as described above in relation to FIGS. 1A-1C.

In some embodiments, the anomaly detector 214 may identify various indications of anomalies associated with transactions. For example, the detector 214 may identify transactions that may be declined, transactions that may be unauthorized, and/or other irregular transactions, potentially over one or more periods of time, such as hours, days, and/or months. In some instances, the detector 214 may also identify an increase in the number of declined transactions over a period of time, such as in an hour or possibly less time. Further, the detector 214 may determine that the declined transactions are attributed to the token deficiencies described above. Yet further, the detector 214 may determine the declined transactions are attributed to an insufficient operating capacity for processing the transactions, among other aspects of the system.

In some embodiments, the machine learning component 216 may be configured to learn various indications of anomalies, such as those described above in relation to the number of declined transactions. In some instances, the component 216 may perform machine learning based on various self-learning mechanisms associated with detecting the indications of anomalies of the network 207 and applying a number of intelligent rules, possibly to prevent valid transactions from declining. Notably, the component 216 may include a neural network configured to perform various system operations based on the learned indications of anomalies and/or the number of learned rules. In particular, the component 216 may generate feedback data to various other components of the system 200, such as the monitoring platform 206 and/or the PCE 204, possibly over the connections 208 and/or 210, respectively. As noted, the learned indications of anomalies may be displayed by one or more devices, possibly to inform system administrators of the anomalies.

Figure 2B:
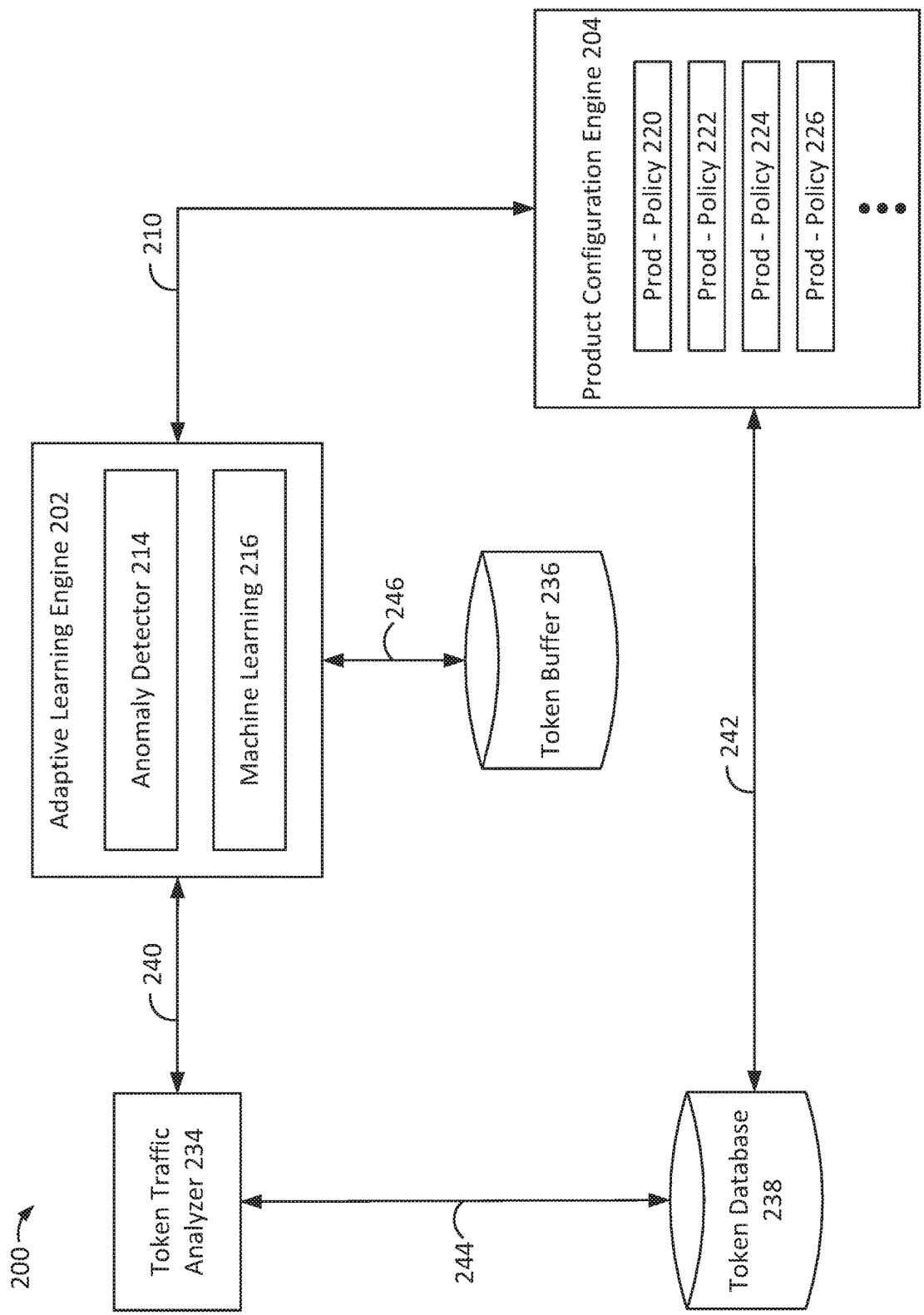
FIG. 2B illustrates the exemplary system with product-policy data, according to an embodiment.

FIG. 2B illustrates the exemplary system 200 with the token traffic analyzer (TTA) 234, according to an embodiment. As shown, the system 200 may include the ALE 202, the PCE 204, the TTA 234, a token buffer 236, and a token database 238. In some embodiments, the TTA 234 is configured to analyze token traffic associated with one or more networks 207, including various requests, such as token requests, requests to process transactions with tokens, and/or requests for multiple services associated with token verification, among other possibilities.

Further, the ALE 202 may include the anomaly detector 214 and the machine learning component 216, as described above. Yet further, the PCE 204 may include the product-policy data 220, 222, and/or 224 described above. In addition, the PCE 204 may include the product-policy data 226, among other data contemplated with the ellipses below the data 226. In addition, there may also be a connection 210 between the ALE 202 and the PCE 204, a connection 240 between the ALE 202 and the TTA 234, a connection 242 between the token database 238 and the PCE 204, a connection 244 between the TTA 234 and the token database 238, and a connection 246 between the ALE 202 and the token buffer 236.

In some embodiments, the system 200 may identify one or more token requests, possibly where the tokens requested are received from the network 207. For example, the tokens may be requested such that one or more corresponding transactions in the network 207 may be processed. As such, the system 200 may determine an indication of token traffic in the network 207. In particular, the TTA 234 may determine one or more indicators, signs, and/or signals of token traffic based on the one or more token requests, tokens issued over a period of time, and/or tokens transferred over the network 207. Further, the system 200 may determine a token depletion rate based on the indication of token traffic in the network 207 described above, such as the number of tokens issued over the number of tokens generated in a given period of time. In some instances, the system 200 may determine the token depletion rate with the monitoring platform 206 based on the various indications of token traffic. As such, the system 200 may generate a number of tokens in the token buffer 236 and/or token database 238 in response to the token depletion rate. Further, the system 200 may learn one or more indications of anomalies in the network 207 associated with the token traffic, such as the various anomalies described above possibly related to declined transactions. Notably, the system 200 may include a non-transitory memory and one or more hardware processors coupled to the non-transitory memory. The processors may be configured to read instructions from the non-transitory memory to cause the system 200 to perform the operations described herein.

In some embodiments, tokens may be associated with a given bin range. For example, considering the scenarios above, the number of tokens generated by the system 200 may be associated with a first bin range, possibly where the tokens are assigned respective identifiers based on the first bin range. Further, the system 200 may detect a low token indication, such as a low token count, based on the token depletion rate. The low token indication may represent that there may not be enough tokens to process the requested transactions. The low token indication may include a sign and/or a signal indicating that a number of the transactions may be declined based on the shortage of tokens. For example, the system 200 may detect a low token indication based on data retrieved from the monitoring platform 206. As such, the system 200 may provision a second bin range for a second number of tokens based on the low token indication. Further, the system 200 may generate the second number of tokens in the token buffer 236 and/or the token database 238 based on the second bin range. As shown, the product-policy data 226 may be added to the PCE 204 based on the second number of tokens generated for the second bin range.

As noted, the system 200 may identify one or more declined transactions. In some instances, the declined transactions may be associated with buyers, sellers, and/or partners of the transaction, among other participating entities associated with the system 200. Further, the system 200 may identify the declined transactions based on the one or more learned indications of anomalies in the network 207 described above, such as irregular activities including unauthorized transactions, irregular transactions, and/or insufficient system capacities to process the transactions. As such, the system 200 may modify the product-policy data 220, 222, and/or 224 of the PCE 204 based on the one or more declined transactions, such that the declined transactions may be avoided.

Further, as noted, the system 200 may determine various operating capacities of the system 200. For example, the system 200 may determine an operating capacity associated with processing a number of transactions with the system 200. In particular, the operating capacity may be a higher operating capacity based on an increased number of transactions, possibly where the number of transactions per second meets or exceeds a given transaction threshold, e.g., 10,000 transactions per second in one or more circumstances. Yet, in some instances, the operating capacity may be a lower operating capacity based on a decreased number of transactions, possibly where the number of transactions per second, e.g., 4,000 transactions per second, is below the transaction threshold described above to be 10,000 transactions per second. In some instances, possibly where there is a lower operating capacity, the system 200 may determine a reserve capacity associated with the operating capacity, e.g., 6,000 transactions per second, possibly in response to the one or more learned indications of anomalies in the network 207. As such, the system 200 may predict and/or anticipate that additional capacity may be needed in various other sites of the system 200. Thus, the system 200 may share the reserve capacity, e.g., 6,000 transactions per second, with a number of sites associated with the system 200. For example, the system 200 may perform additional transactions associated with such sites based on the reserve capacity.

Figure 2C:
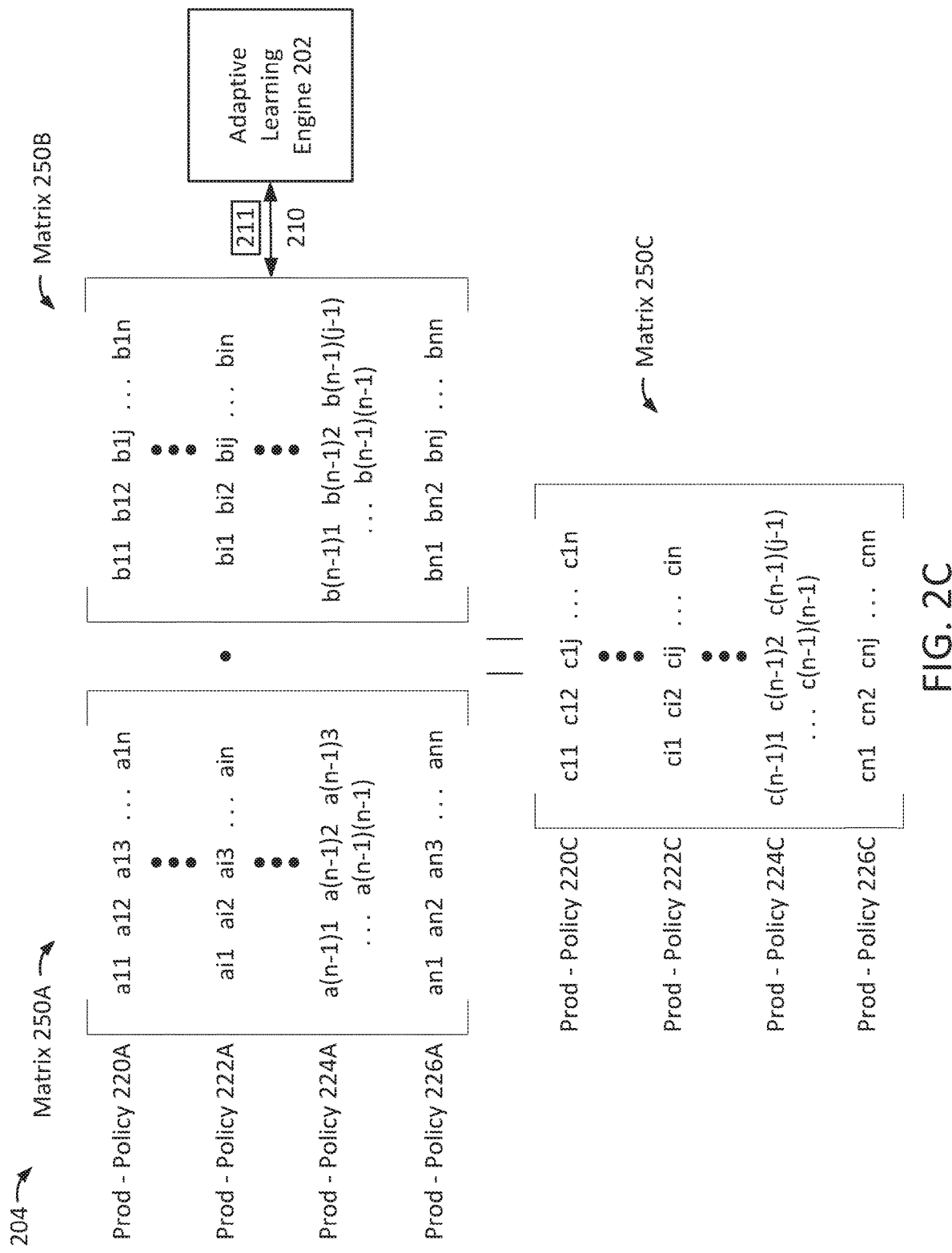
FIG. 2C illustrates an product configuration engine (PCE) with matrices, according to an embodiment.

FIG. 2C illustrates the PCE 204 with matrices 250A, 250B, and 250C, according to an embodiment. In some embodiments, the system 200 may optimize various forms of data as described above in relation to FIGS. 1A-1C. As such, the matrices 250A, 250B, and 250C may take the form of the matrices 150A, 150B, and 150C, respectively, as described above.

For example, the matrix 250A may include a number of values that represent the core and/or profile elements described above. As shown, the matrix 250A is represented with product-policy data 220A in the first row including the data (a11), data (a12), data (a13), and other data contemplated with the ellipses, and further the data (a1n), where "n" is the number columns and the number rows in the matrix 250A. Product-policy data 222A corresponds to the second row including the data (ai1), data (ai2), data (ai3), and other data contemplated with the ellipses, and further the data (ain), where "i" is the particular row in the matrix 250A. Product-policy data 224A corresponds to the third row including the data (a(n−1)1), data (a(n−1)2), data (a(n−1)3), and other data contemplated with the ellipses, and further the data (a(n−1)(n−1)). Product-policy data 226A corresponds to the fourth row including the data (an1), data (an2), data (an3), and other data contemplated with the ellipses, and further the data (ann).

Further, the matrix 250B may also be a multi-dimensional matrix, possibly formed with inputs from the adaptive learning engine 202 over the connection 210, as described above. In some embodiments, the system 200 may determine and/or retrieve the feedback data 211 from the ALE 202. In some instances, the feedback data 211 may be generated by the machine learning component 216 of the ALE 202, possibly indicating the one or more learned indications of anomalies. For example, the feedback data 211 may be determined based on the one or more learned indications of anomalies associated with the network 207, possibly indicating the declined transactions, the depleted number of tokens available, and/or an insufficient operating capacity to process the transactions, as noted above. Yet further, the system 200 may determine the intermediate matrix 250B that represents policy requirements in binary form based on the feedback data 211 from the ALE 202.

The matrix 250B may be a representation of decision actions in one or more policy domains provided in binary form. For example, the value of "1" may indicate that an element is required and the value of "0" may indicate that an element is not required, as described above. As shown, the matrix 150B is represented with a first row including the data (loll), data (b12), data (b1j), and other data contemplated with the ellipses, and further the data (bin), where the "j" is any number between 3 and "n," and where "n" may be the number of columns and the number of rows in the matrix 250B. The second row may include the data (bi1), data (bi2), data (bij), and other data contemplated with the ellipses, and further the data (bin). The third row may include the data (b(n−1)1), data (b(n−1)2), data (b(n−1)(j−1)), and other data contemplated with the ellipses, and further the data (b(n−1)(n−1)). The fourth row may include the data (bn1), data (bn2), data (bnj), and other data contemplated with the ellipses, and further the data (bnn).

In some embodiments, the system 200 and/or the PCE 204 may perform an operation, such as a multiplication operation, with the matrix 250A and the matrix 250B to provide the matrix 250C. As such, the elements that are not required are masked with the value of "0" based on the matrix operation with the matrix 250B and the matrix 250C, where the matrix 250C may include the elements required to process the transactions, thereby avoiding the payload duplication as described above. In some instances, the matrix 250C may only include the elements required to process the transactions.

As shown, the matrix 250C is represented with the product-policy data 220C in the first row including the data (c11), data (c12), data (c1j), and other data contemplated with the ellipses, and further the data (c1n), where the "j" is any number between 2 and "n," and also where "n" may be the number of columns in the matrix 250C. The product-policy data 222C is shown in the second row including the data (ci1), data (ci2), data (cij), and other data contemplated with the ellipses, and further the data (cin). The product-policy data 224C is shown in the third row including the data (c(n−1)1), data (c(n−1)2), data (c(n−1)(j−1)), and other data contemplated with the ellipses, and further the data (c(n−1)(n−1)). The product-policy data 226C is shown in the fourth row may include the data (cn1), data (cn2), data (cnj), and other data contemplated with the ellipses, and further the data (cnn).

Notably, the matrix 250C may also save processing latency in various orders of magnitude. Further, the matrix 250C may be standardized over numerous domains across platforms, such as the platform 206 described above. As such, the various platforms, including the platform 206, may recognize the specific product and/or policy configurations indicated by the matrix 250C. Based on removing the unnecessary elements, the time, processor cycles, and the processing power to provision a product will be exceptionally less than conventional systems. For example, by removing unnecessary elements, various data management operations may be reduced, such as the reduction in the number of data fields of the transferred data, the amount of the data stored, and/or the data processed, among additional operations related to data management.

In some embodiments, the system 200 may determine the first matrix 250A associated with the first product-policy data 220A-226A. Further, the system 200 may determine a second intermediate matrix 250B that represents policy requirements in binary form based on feedback data 211 from the ALE 202, possibly where the feedback data 211 may modify the policy requirements in real-time. As such, the system 200 may perform one or more matrix operations, such as matrix multiplication, with the first matrix 250A and the second intermediate matrix 250B based on the feedback data 211 from the ALE 202. Further, the system 200 may generate the third output matrix 250C with second product-policy data 220C-226C. As noted, the system 200 may activate the second bin range for a second number of tokens based on a low token indication detected. In such instances, the system 200 and/or the PCE 204 may generate the product-policy data 226C based on the second bin range. As shown in FIG. 2B, the adaptive product-policy data 226 may be added, thereby underscoring the addition of the second bin range.

In some embodiments, the system 200 may perform various operations based on one or more declined transactions. For example, the system 200 may determine and/or identify the one or more declined transactions in the network 207. Further, the system 200 may identify a number of anomalous transactions in the network 207 based on the one or more declined transactions determined in the network 207. For example, the one or more declined transactions may be part of a large number of the anomalous transactions in the network 207. As such, the system 200 may identify one or more issuer systems associated with the number of anomalous transactions, possibly where the issuer systems may be one or more root causes of the anomalous transactions. In some instances, the system 200 may identify the issuer systems as potentially related to the number of anomalous transactions.

In some embodiments, the system 200 may perform modifications based on one or more declined transactions. For example, referring back to FIG. 2B, the system 200 may modify the product-policy data 220, 222, and/or 224 of the PCE 204 based on the one or more identified issuer systems associated with the number of anomalous transactions. As noted, for example, the product-policy data 226 may be added to the PCE 204, possibly based on the one or more identified issuer systems incurring token deficiencies. Yet further, the system 200 and/or the ALE 202 may learn one or more system operations based on the one or more identified issuer systems associated with the number of anomalous transactions. For example, the system 200 may learn to provision additional bin ranges based on the number of anomalous transactions, the token deficiencies, and/or the insufficient system capacities. Notably, a non-transitory machine-readable medium of the system 200 may have stored thereon machine-readable instructions executable to cause a machine to perform the various operations described herein.

In some embodiments, the system 200 may identify potential causes of the one or more declined transactions. For example, the system 200 may determine a token depletion rate based on the monitoring platform 206, where the platform 206 may monitor activities in the network 207. For example, the system 200 may determine the token depletion rate associated with the one or more issuer systems described above. As noted, for example, the one or more issuer systems may incur a number of token deficiencies, thereby causing the number of anomalous transactions identified by the system 200. As such, the system 200 may generate a number of tokens in the token buffer 236 and/or the token database 238 based on the token depletion rate determined.

Yet further, in some instances, the number of generated tokens may be associated with a first bin range. As such, the system 200 may detect a low token indication, such as the low token count described above associated with the one or more issuer systems. In some instances, the low token indication may be detected based on the token depletion rate associated with the one or more issuer systems, potentially detected based on the activity monitor provided in the monitoring platform 206. In some instances, the system 200 may provision a second bin range for a second number of tokens based on the low token indication. As such, the system 200 may generate the second number of tokens in the token database 238 based on the second bin range to process the transactions.

In some embodiments, the system 200 may activate the second bin range for the second number of tokens based on a low token indication detected in association with the one or more issuer systems. As noted, the system 200 may generate the second number of tokens in the token database 238 based on the activated second bin range. Yet further, the system 200 may generate the product-policy data 226 based on the second bin range. For example, the product-policy data 226 may be generated based on the PCE 204 of the system 200, thereby underscoring the addition of the second bin range. As noted, in some instances, the bin and/or the bin ranges, may refer to a bank identification number, such as the "BIN" and/or the BIN range. For example, the bin and/or the bin ranges may follow the International Organization for Standardization (ISO), such as the ISO/IEC 7812, that correspond to the number systems. Yet further, the bin and/or the bin ranges may also refer to an issuer identification number and/or an "IIN," possibly represented by six digits that also indicate the major industry identifier, where the IIN may identify the issuing organizations.

In some embodiments, the system 200 may learn from the one or more declined transactions, the number of anomalous transactions, token deficiencies possibly associated with the one or more issuer systems, and/or the insufficient system capacities. As such, the system 200 may determine the feedback data 211 from the ALE 202 based on the one or more learned system operations, such as the operations described above to generate additional tokens. In some instances, the system 200 may determine and/or modify the intermediate matrix 250B that represents the policy requirements in binary form based on the feedback data 211, possibly based on the additional tokens generated. In particular, the matrix 250B may be modified to include elements required to process the declined transactions.

For example, the system 200 may determine the first matrix 250A associated with the first product-policy data 220A-226A. Further, the system 200 may determine the second intermediate matrix 250B that represents the policy requirements described above to be in binary form based on feedback data 211 from the ALE 202. As such, the system 200 may perform one or more matrix operations, such as the matrix multiplication, with the first matrix 250A and the second intermediate matrix 250B based on the feedback data 211. As such, the system 200 may generate the third output matrix 250C with the second product-policy data 220B-226C.

In some embodiments, the system 200 may balance various operating capacities across the system 200, possibly including the issuer systems described above. For example, the system 200 may determine an operating capacity associated with processing transactions with the system 200. Further, the system 200 may determine the reserve capacity from the operating capacity, possibly based on the one or more learned indications of anomalies in the network 207. Yet further, the system 200 may share the reserve capacity with the one or more identified issuer systems, as described above, potentially where the identified issuer systems require the additional capacity to process the number of declined transactions. As such, the system 200 may efficiently allocate its capacities to ensure operability across the identified issuer systems and/or other sites in the network 207.

Figure 3:
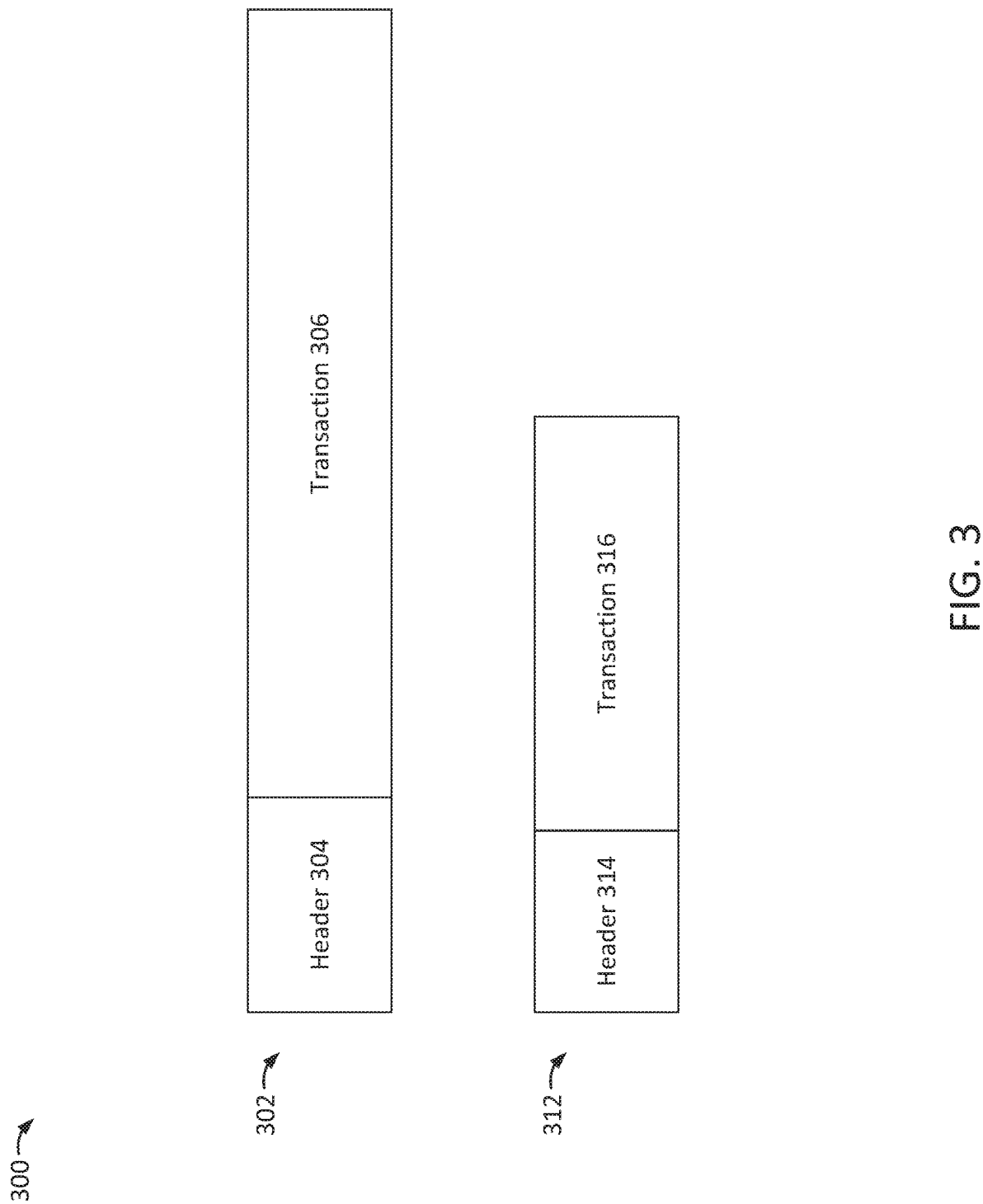
FIG. 3 illustrates an exemplary system with transfer data, according to an embodiment.

FIG. 3 illustrates an exemplary system 300 with transfer data 302 and 312, according to an embodiment. The system 300 may include aspects of the systems 100 and/or 200 described above. For example, the system 300 may include the ALE 202, the PCE 204, the TTA 234, the token buffer 236, and/or the token database 238, among other components described herein. The data 302 may be transferred over the network 207 to process the transaction data 306, possibly also referred to as the transaction 306. As shown, the transfer data 302 may include the header 304, the transaction data 306, also possibly a trailer. Yet, the data 312 may also be transferred over the network 207 to process the transaction data 316, possibly also referred to as the transaction 316. As shown, the transfer data 312 may include the header 314, the transaction data 316, and also possibly a trailer.

Notably, the headers 304 and 314 may represent the core elements described above, possibly including various identifiers to move the money assets. In particular, the identifiers may be provided with the transaction data 306 and 316, respectively. In some instances, the headers 304 and 314 may identify the buyer, the seller, and/or the consumer, among other characteristics and/or attributes including the products and/or policy requirements associated with the transaction data 306 and 316, respectively. For example, the headers 304 and 314 may identify the respective transaction data 306 and 316 as mass payments, multi-entity payments, a point-to-point payment, and/or a number of checkout processes, among numerous other possible product combinations.

In some embodiments, the transaction data 306 and 316 may be processed by the system 200 based on the respective headers 304 and 314. For example, the transaction data 306 may be processed differently than the transaction data 316 based on the respective headers 304 and 314. For instance, consider the scenario where the header 304 indicates a mass payment, where a mass payment may be a payment for an amount that is greater than one or more threshold amounts, possibly involving multiple entities. In such instances, various risk indications may be determined based on the type of payment involved with the data 306, potentially due to the mass payment type. In another example, consider the scenario where the header 314 indicates that one of the participating entities is a preferred partner, possibly such that the processing of the transaction 316 may be ensured and/or guaranteed.

In one example, consider that the headers 304 and 314 indicate mass payments. In such instances, the transfer data 302 may be generated based on the matrix 250A including the product-policy data 220A-226A, as described above. Yet further, the transfer data 312 may be generated based on the matrix 250C, where various elements in the matrix 250C may be masked based on the matrix multiplication with the matrix 250A and the matrix 250B, as described above. As such, the header 314 may include elements required to process the transaction data 316, thereby removing unnecessary data, as shown by the size of the header 314 and/or the transaction data 316. For example, the size of the header 314 and the transaction data 316 may be smaller than the header 304 and the transaction 316. As such, the transfer data 312 may be smaller than the transfer data 302, thereby making the storing, transferring, and/or processing of the data 312 more efficient. In particular, the system 300 may utilize less memory to store the data 312, less processor cycles to process the data 312, and/or less time to process the data 312, thereby improving the overall system capacity and optimizing system efficiency, potentially measured in transactions per second, as described above.

Figure 4:
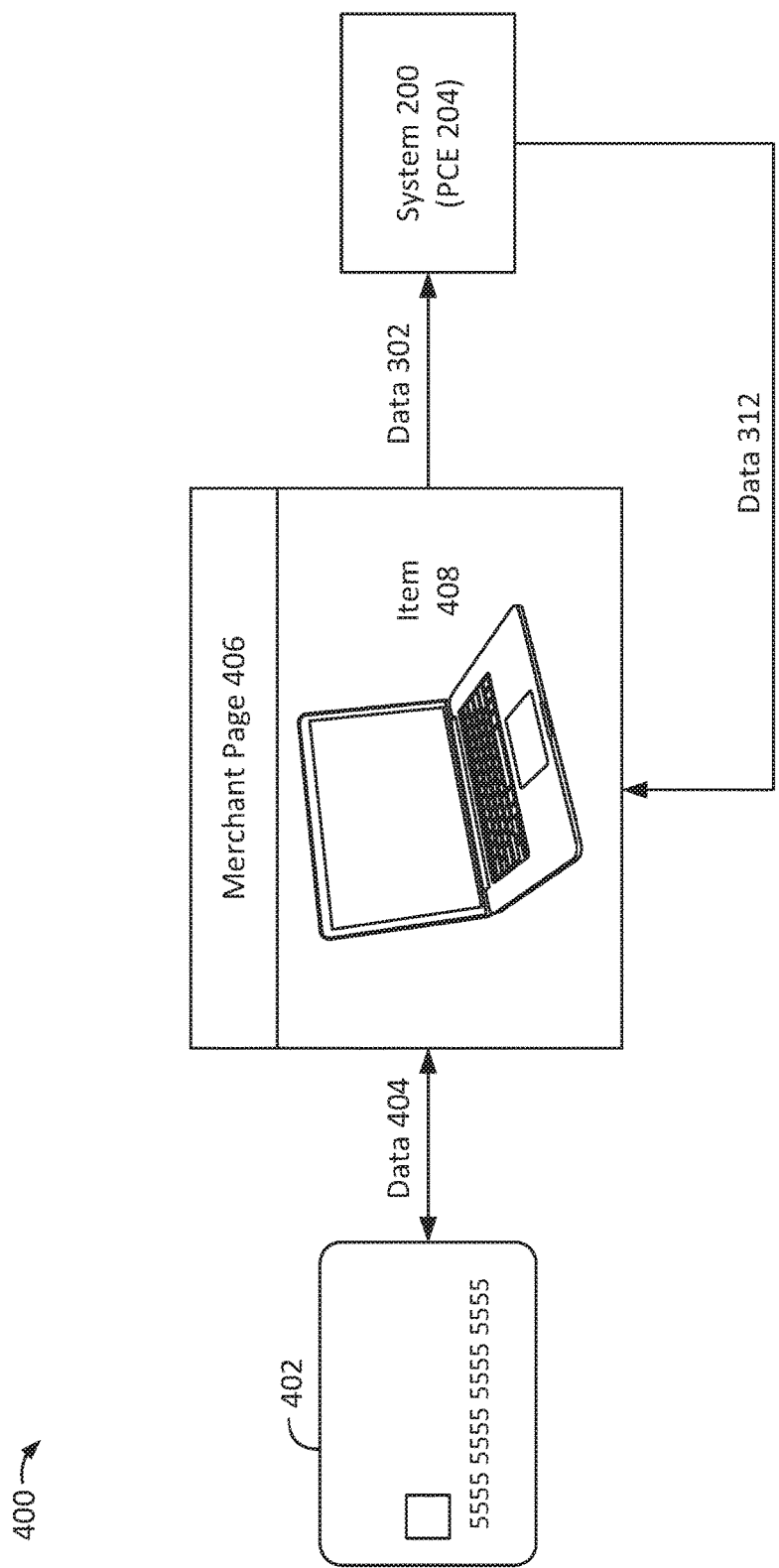
FIG. 4 illustrates an exemplary system, according to an embodiment.

FIG. 4 illustrates an exemplary system 400, according to an embodiment. As shown, FIG. 4 includes an instrument 402, a data transfer 404, and a merchant page 406 providing an item 408. For example, consider a scenario where a user is browsing on the merchant page 406 and identifies the item 408, possibly a laptop computer that the user may be interested in purchasing. As such, the user may use the instrument 402 to purchase the item 408. In particular, the data 404 transferred may identify details of the instrument 402 to the merchant page 406, possibly including a credit card number, an expiration date, and/or a card verification value (CVV) number.

In some embodiments, the merchant page 406 may transfer data 302 to the system 200. Notably, the data 302 may include the header 304 and the transaction data 306 described above. Further, the system 200 shown may include the product configuration engine (PCE) 204. Yet, as noted above, the PCE 204 may generate the transfer data 312 to process the requested transaction. As noted, the transfer data 312 may be generated based on the matrix 250C described above, where various elements in the matrix 250C may be masked based on the matrix multiplication with the matrix 250A and the matrix 250B, as described above. As such, the matrix 250C may provide only the elements required to process the transaction data 312, thereby removing unnecessary data, thereby improving the overall system capacity and optimizing the system efficiency as described above in relation to FIG. 3. Notably, the system 400 may include aspects of the systems 100 and/or 200 described above. For example, the merchant page 406 may available with the monitoring platform 206 and/or the network 207 described above in relation to FIGS. 2A-2C.

Figure 5:
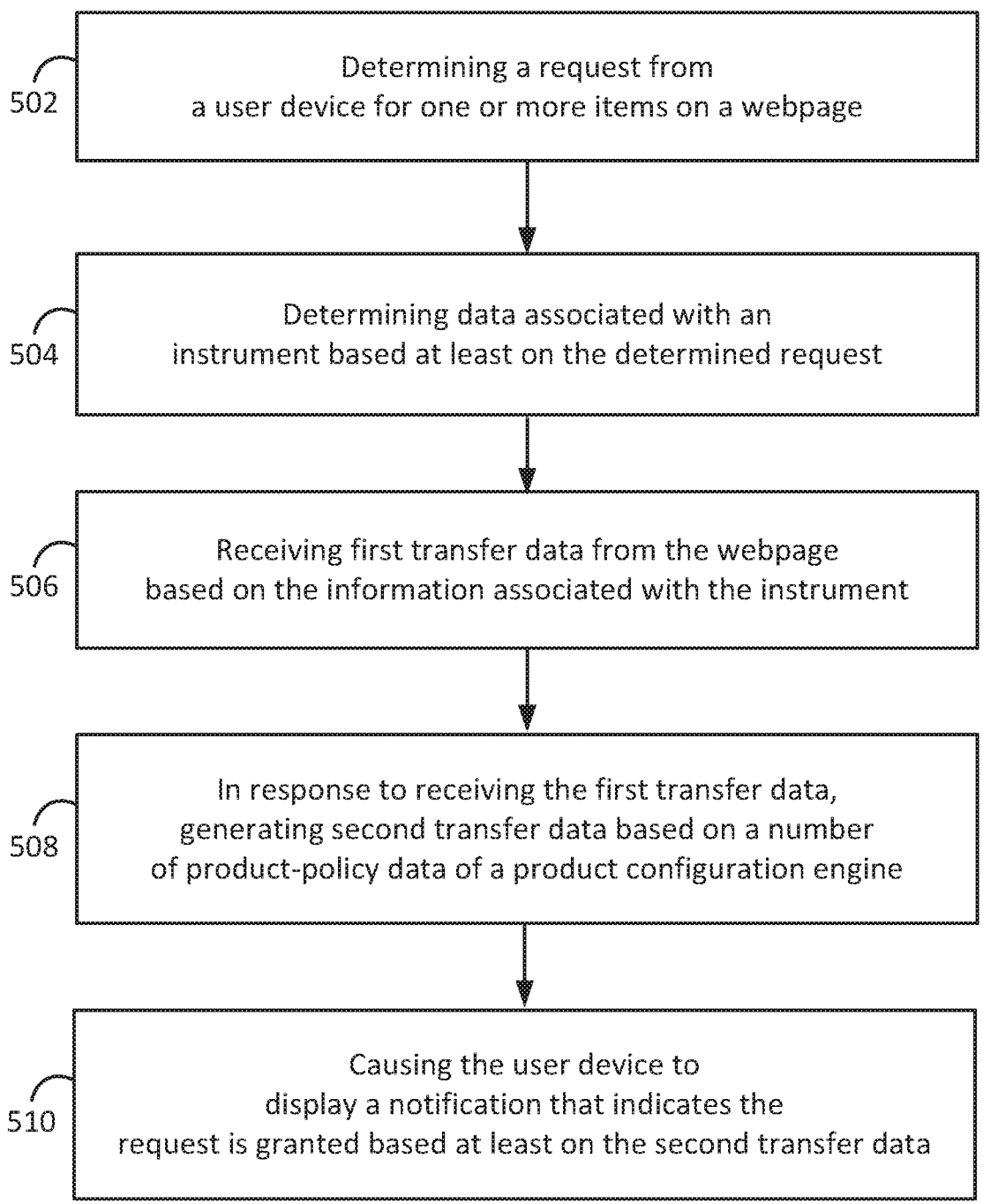
FIG. 5 illustrates an exemplary method, according to an embodiment.

FIG. 5 illustrates an exemplary method 500, according to an embodiment. The method 500 may be performed by the systems 100, 200, 300, and/or 400. Notably, one or more steps of the method 400 described herein may be omitted, performed in a different sequence, and/or combined with other methods for various types of applications contemplated herein, such as improving system capacities and/or efficiencies.

At step 502, the method 500 may include determine a request from a user device for one or more items on a webpage. For example, referring back to FIG. 4, the request from the user device may be for the item 408 on the webpage 406.

At step 504, the method 500 may include determining data associated with an instrument based at least on the determined request. For example, the data 404 may be determined to be associated with the instrument 402 based on the request from the user device.

At step 506, the method 500 may include receiving first transfer data from the webpage based on the data associated with the instrument. For example, referring back to FIGS. 3-4, the first transfer data 302 may be received from the webpage 406 based on the data 404 associated with the instrument 402.

At step 508, in response to receiving the first transfer data, the method 500 may include generating second transfer data based on a number of product-policy data of a product configuration engine. For example, as noted, the first transfer data 302 may be received by the system 200. Further, in response, the second transfer data 312 may be generated, possibly based on the product-policy data 220-226 and/or 220C-226C described above.

At step 510, the method 500 may include causing the user device to display a notification that indicates the request is granted based on the second transfer data. In some instances, the user device may take the form of a smartphone that displays the notification based on the second transfer data 312 described above.

In some embodiments, the method 500 may include steps associated with the token depletion rate described above. For example, the method 500 may include determining the token depletion rate associated with the system capacity required to grant the request for the one or more items 408. For example, referring back to FIGS. 1A-4, the token depletion rate may be determined by the system 200, possibly based on activity monitor of the platform 206, the token buffer 236, and/or the token database 238. Further, the method 500 may include generating a number of tokens based on the token depletion rate. As noted, the generated tokens may be stored in the token buffer 236 and/or the token database 238. As such, the request for the item 408 may be granted based on the number of generated tokens.

In some embodiments, the method 500 may include steps associated with the bin ranges. For example, a number of the generated tokens may be associated with a first bin range. As such, the method 500 may include provisioning a second bin range for a second number of tokens. For example, the second bin range may be provisioned based on a low token indication, possibly determined in the one or more scenarios described above. As such, the method 500 may include generating a second number of tokens based on the second bin range. As such, the request for the item 408 may be granted based on the second number of generated tokens.

In some embodiments, the method 500 may include steps to communicate with the adaptive learning engines, such as the ALE 202 described above. For example, the method 500 may include determining and/or receiving the feedback data 211 from the ALE 202. As noted, the feedback data 211 may be based on one or more learned indications of anomalies in the network 207, possibly associated with the request from the user device. In particular, the one or more learned indications of anomalies may be based on an increase in the number of requests from various users of the system 200. As such, the method 500 may include determining and/or modifying the intermediate matrix 250B that represents the policy requirements to grant the request. In particular, the intermediate matrix 250B may be determined based on the feedback data 211 from the ALE 202.

In some embodiments, the method 500 may also include steps to perform the matrix operations described above. For example, the method 500 may include determining the first matrix 250A associated with first product-policy data 220A-226A. Further, as noted, the method 500 may include determining a second intermediate matrix 250B that represents the policy requirements to grant the request, where the matrix 250B may be determined based on feedback data 211 from the ALE 202. Further, the method 500 may include performing one or more matrix operations with the first matrix 250A and the second intermediate matrix 250B based on the feedback data 211. Yet further, the method 500 may include generating the third output matrix 250C with second product-policy data 220C-226C, where the second transfer data 312 may be generated based on the third output matrix 250C.

In some embodiments, the method 500 may also include steps to share various system capacities with other sites. For example, the method 500 may include determining an indication of an operating capacity of the system 200 associated with processing the request for one or more items 408. Further, the method 500 may include determining a reserve capacity of the system 200 associated with the operating capacity. In particular, the reserved capacity may be determined in response to receiving the feedback data 211 from the ALE 202 of the system 200, as described above. Yet further, the method 500 may include identifying a number of sites associated with the system 200 that require additional capacity to process a number of transactions accordingly. As such, the method 500 may include sharing the reserve capacity with the number of sites based on the additional capacity required by the number of sites to process the number of transactions.

Figure 6:
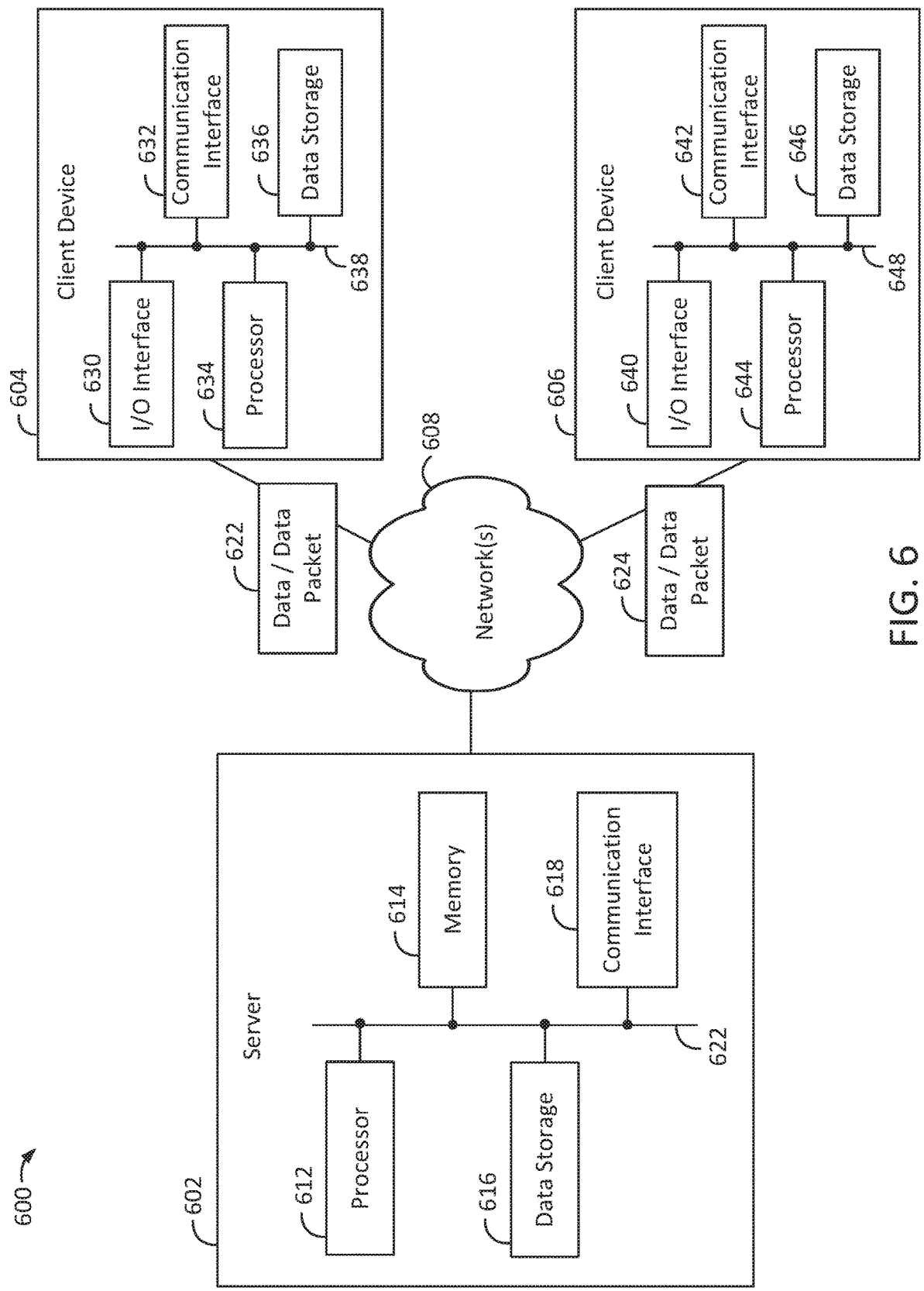
FIG. 6 is a simplified block diagram of an exemplary system, according to an embodiment.

FIG. 6 is a simplified block diagram of an exemplary system 600, according to an embodiment. The system 600 may include aspects of the systems 100, 200, 300, and/or 400, among the other systems contemplated herein. For example, the system 600 may include a server 602. The server 602 may be configured to perform the operations described herein, such as those involving the adaptive learning engine (ALE) 202 and the product configuration engine (PCE) 204, among other components described above. Yet further, the server 602 may be configured to perform such operations for a provider, such as PayPal, Inc. of San Jose, Calif., USA. In addition, the system 600 may also include a client device 604 and a client device 606. As such, the server 602 and the client devices 604 and 606 may be configured to communicate over the one or more networks 608, possibly including the network 207 described above. As such, the system 600 includes multiple computing devices 602, 604, and/or 606.

The system 600 may operate with more or less than the computing devices 602, 604, and/or 606 shown in FIG. 6, where each device may be configured to communicate over the one or more communication networks 608, possibly to transfer data accordingly. The one or more communication networks 608 may include a packet-switched network configured to provide digital networking communications and/or exchange data of various forms, content, type, and/or structure. In some instances, the one or more communication networks 608 may include a data network, a private network, a local area network (LAN), a wide area network (WAN), a telecommunications network, and/or a cellular network, among other possible networks. In some instances, the communication network 608 may include network nodes, web servers, switches, routers, base stations, microcells, and/or various buffers/queues to transfer data packets 622 and/or 624.

The data packets 622 and/or 624 may include the various forms of data, such as the data 302 and/or 312, respectively, possibly associated with the user accounts. For example, the data packets 622 and/or 624 may be transferrable using communication protocols, such as packet layer protocols, packet ensemble layer protocols, and/or network layer protocols, among other types of communication protocols. For example, the data packets 622 and/or 624 may be transferrable using transmission control protocols and/or internet protocols (TCP/IP). In various embodiments, each of the data packets 622 and 624 may be assembled or disassembled into larger or smaller packets of varying capacities. As such, data packets 622 and/or 624 may be transferrable over the one or more networks 608 and to various locations in the one or more networks 608.

In some embodiments, the server 602 may take a variety of forms. The server 602 may be an enterprise server, possibly operable with one or more operating systems to facilitate the scalability of the architecture associated with the system 600. For example, the server 602 may operate with a Unix-based operating system configured to integrate with a growing number of servers in the one or more networks 608, the client devices 604 and/or 606, among other computing devices configured to communicate with the system 600. The server 602 may further facilitate workloads associated with numerous data transfers in view of an increasing item requests generated by the client devices 604 and/or 606. In particular, the server 602 may facilitate the scalability relative to such an increasing number of item requests to eliminate data congestion, bottlenecks, and/or transfer delays.

In some embodiments, the server 602 may include multiple components, such as one or more hardware processors 612, non-transitory memories 614, non-transitory data storages 616, and/or communication interfaces 618, among other possible components described in relation to FIG. 6, any of which may be communicatively linked via a system bus, network, or other connection mechanism 622. The one or more hardware processors 612 may take the form of a multi-purpose processor, a microprocessor, a special purpose processor, a digital signal processor (DSP) and/or other types of processing components. For example, the one or more hardware processors 612 may include an application specific integrated circuit (ASIC), a programmable system-on-chip (SOC), and/or a field-programmable gate array (FPGA). In particular, the one or more hardware processors 612 may include a variable-bit (e.g., 64-bit) processor architecture configured to transfer the data packets 622 and/or 624. As such, the one or more hardware processors 612 may execute varying instructions sets (e.g., simplified and complex instructions sets) with fewer cycles per instruction than other general-purpose hardware processors, thereby improving the performance of the server 602, possibly based on the operations described herein. In practice, for example, the one or more hardware processors 612 may be configured to read instructions from the non-transitory memory component 614 to cause the system 600 to perform operations as described herein.

The non-transitory memory component 614 and/or the non-transitory data storage 616 may include one or more volatile, non-volatile, and/or replaceable storage components, such as magnetic, optical, and/or flash storage that may be integrated in whole or in part with the one or more hardware processors 612. Further, the memory component 614 may include or take the form of a non-transitory computer-readable storage medium, having stored thereon computer-readable instructions that, when executed by the one or more hardware processors 612, cause the server 602 to perform operations described in this disclosure, illustrated by the accompanying figures, and/or otherwise contemplated herein.

The communication interface component 618 may take a variety of forms and may be configured to allow the server 602 to communicate with one or more devices, such as the client devices 604 and/or 606. For example, the communication interface 618 may include a transceiver that enables the server 602 to communicate with the client devices 604 and/or 606 over the one or more networks 608. In some instances, the communication interface 618 may include a wired interface, such as an Ethernet interface, to communicate with the client devices 604 and/or 606. Further, in some instances, the communication interface 618 may include a cellular interface, such as a Global System for Mobile Communications (GSM) interface, a Code Division Multiple Access (CDMA) interface, and/or a Time Division Multiple Access (TDMA) interface. Yet further, in some instances, the communication interface 618 may include a local area network interface, such as a WI-FI interface configured to communicate with a number of different protocols. As such, the communication interface 618 may include a wireless interface operable to transfer data over short distances utilizing short-wavelength radio waves in approximately the 2.4 to 2.485 GHz range. In some instances, the communication interface 618 may send/receive data or data packets 622 and/or 624 to/from client devices 604 and/or 606.

The client devices 604 and 606 may also be configured to perform a variety of operations such as those described in this disclosure, illustrated by the accompanying figures, and/or otherwise contemplated herein. In particular, the client devices 604 and 606 may be configured to transfer data packets 622 and/or 624 to and from the server 602. The data packets 622 and/or 624 may also include location data associated with the request items, such as Global Positioning System (GPS) data or GPS coordinate data. Yet further, the data packets 622 and/or 624 may include environmental data including triangulation data, beacon data, WI-FI data, temperature data, and/or sensor data. As noted, the data packets 622 and/or 624 may include the transfer data 302 and/or 312 among other types of data.

In some embodiments, the client devices 604 and 606 may include or take the form of a smartphone system, a personal computer (PC), such as a laptop device, a tablet computer device, a wearable computer device, a head-mountable display (HMD) device, a smart watch device, and/or other types of computing devices configured to transfer data associated with a user account. The client devices 604 and 606 may include various components, including, for example, input/output (I/O) interfaces 630 and 640, communication interfaces 632 and 642, hardware processors 634 and 644, and non-transitory data storages 636 and 646, respectively, all of which may be communicatively linked with each other via a system bus, network, or other connection mechanisms 638 and 648, respectively.

The I/O interfaces 630 and 640 may be configured to receive inputs from and provide outputs to users of the client devices 604 and 606. For example, the I/O interface 630 may include a graphical user interface (GUI) configured to receive a user input that activates the provider application with the other applications. Thus, the I/O interfaces 630 and 640 may include displays and/or input hardware with tangible surfaces, such as touchscreens with touch sensors and/or proximity sensors configured with variable sensitivities to detect the touch inputs from a user. The I/O interfaces 630 and 640 may also be synched with a microphone, sound speakers, and/or other audio mechanisms configured to receive voice commands. Further, the I/O interfaces 630 and 640 may also include a computer mouse, a keyboard, and/or other interface mechanisms. In addition, I/O interfaces 630 and 640 may include output hardware, such as one or more touchscreen displays, haptic feedback systems, and/or other hardware components.

In some embodiments, communication interfaces 632 and 642 may take a variety of forms. For example, communication interfaces 632 and 642 may be configured to allow client devices 604 and 606, respectively, to communicate with one or more devices according to a number of protocols described or contemplated herein. For instance, communication interfaces 632 and 642 may be configured to allow client devices 604 and 606, respectively, to communicate with the server 602 via the one or more communication networks 608. The processors 634 and 644 may include one or more multi-purpose processors, microprocessors, special purpose processors, digital signal processors (DSP), application specific integrated circuits (ASIC), programmable system-on-chips (SOC), field-programmable gate arrays (FPGA), and/or other types of processing components described or contemplated herein.

The data storages 636 and 646 may include one or more volatile, non-volatile, removable, and/or non-removable storage components, and may be integrated in whole or in part with processors 634 and 644, respectively. Further, data storages 636 and 646 may include or take the form of non-transitory computer-readable mediums, having stored thereon instructions that, when executed by processors 634 and 644, cause the client devices 604 and 606 to perform operations, respectively, such as those described in this disclosure, illustrated by the accompanying figures, and/or otherwise contemplated herein.

In some embodiments, the user device 604 may generate a request for the one or more items 408 with a user account. For example, the generated request may be encoded in the data packet 622 to establish a connection with the server 602. As such, the data packet 622 may initiate a search of an internet protocol (IP) address of the server 602 that may take the form of the IP address, 192.168.1.102, for example. In some instances, an intermediate server, e.g., a domain name server (DNS) and/or a web server, possibly in the one or more networks 608 may identify the IP address of the server 602 to establish the connection between the user device 604 and the server 602. As such, the server 602 may grant the request for the one or more items 408.

It can be appreciated that the server 602 and the user devices 604 and 606 may be deployed in various other ways. For example, the operations performed by the server 602 and/or the user devices 604 and 606 may be performed by a greater or a fewer number of devices. Further, the operations performed by two or more of the systems and/or devices 602, 604, and/or 606 may be combined and performed by a single device. Yet further, the operations performed by a single device may be separated or distributed among the server 602, the user devices 604 and 606.

Figure 7:
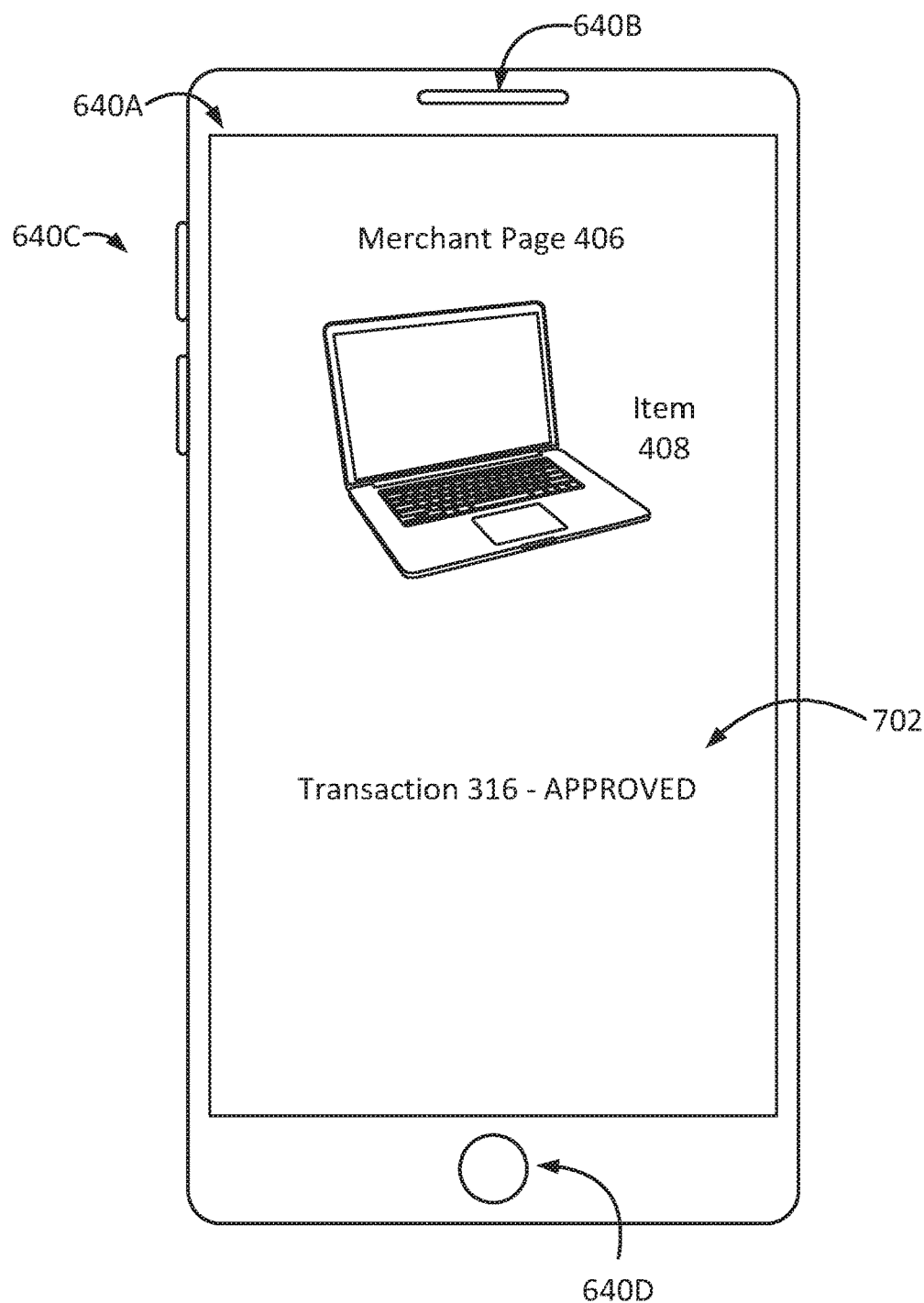
FIG. 7 illustrates a user device, according to an embodiment.

FIG. 7 illustrates the user device 604, according to an embodiment. As shown, the user device 604 may take the form of a smartphone. Yet further, the user device 604 may include aspects of the device 604 described above in relation to FIG. 6. For example, the user device 604 may include the I/O interface 640, which may include the graphical user interface 640A, the speaker 640B, the side buttons 640C, and the button 640D that may include a fingerprint sensor.

As shown, the interface 640A displays the merchant page 406 and the requested item 408 as described above. Further, the interface 640 displays the notification 702 that indicates the request for the item 408 is approved or granted. As noted, referring back to FIG. 4, the data 302 may be received by the system 200 and the data 312 may be transferred to the page 406 to process the transaction for the item 408. As such, the notification 702 indicates that the request for the item 408 is approved and the transaction is processed. In some instances, the transaction may be processed with funds from the user's account.

Notably, a user account associated with a provider may be displayed on the client device 604, possibly with the I/O interface 630. For example, a provider application of the user device 604 may be configured to access the user account displayed on the I/O interface 630. In some instances, the user account may be a personal account associated with funds. Further, the user account may be a corporate account, such that employees, staff, worker personnel, and/or contractors, among other individuals may have access to the corporate account. Further, an account may be a family account created for multiple family members, where each member may have access to the account. Yet further, it should be noted that a user may be a number of individuals, a group, and/or possibly a robot, a robotic device, and/or a robotic system, among other computing devices capable of transferring data associated with the user account. In some instances, login data may be required to access the user account and/or perform a transfer with the account. For example, the data required may include credential information, such as a login, an email address, a username, a password, a phone number, a security code, an encryption key, authentication data, biometric data (e.g., fingerprint data), and/or other types of data to access the user account and/or perform a transfer with the account.

The present disclosure, the accompanying figures, and the claims are not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure.

The invention claimed is:

1. A system comprising:
a non-transitory memory; and
one or more hardware processors coupled to the non-transitory memory and configured to read instructions from the non-transitory memory to cause the system to perform operations comprising:
determining one or more declined transactions in a network;
identifying a plurality of anomalous transactions in the network based at least on the one or more declined transactions;
identifying one or more issuer systems associated with the plurality of anomalous transactions in the network;
learning one or more system operations associated with the one or more issuer systems based on the plurality of anomalous transactions;
modifying product-policy data for the one or more identified issuer systems based on the one or more system operations;
receiving, via a merchant webpage, transaction data associated with a transaction request, wherein the transaction data comprises a header and a body;
modifying the header based on the modified product-policy data; and
transmitting the modified transaction data to an issuer system of the one or more issuer systems.

2. The system of claim 1, wherein the operations further comprise:
determining a token depletion rate associated with the one or more issuer systems based at least on the plurality of anomalous transactions; and
generating a plurality of tokens in a token database based at least on the token depletion rate.

3. The system of claim 2, wherein the plurality of tokens is associated with a first bin range, and wherein the operations further comprise:
detecting a low token indication based at least on the token depletion rate;
provisioning a second bin range for a second plurality of tokens in response to the detecting the low token indication; and
generating the second plurality of tokens in the token database based on the second bin range.

4. The system of claim 1, wherein the operations further comprise:
detecting a low token indication based on the plurality of anomalous transactions; and
activating a bin range for a plurality of tokens based at least on the low token indication, wherein the modifying the product-policy data is further based on the activated bin range.

5. The system of claim 1, wherein the operations further comprise:
determining feedback data based at least on the learning the one or more system operations associated with the one or more issuer systems; and
determining an intermediate matrix that represents policy requirements in a binary form based at least on the feedback data, wherein the product-policy data is modified further using the intermediate matrix.

6. The system of claim 5, wherein the operations further comprise:
determining a first matrix associated with the product-policy data; and
generating a second matrix based on performing one or more matrix operations with the first matrix and the intermediate matrix, wherein the product-policy data is modified further based on the second matrix.

7. The system of claim 1, wherein the operations further comprise:
determining an operating capacity that the system has in processing transactions;
determining a reserve capacity for the system based at least on the learning the one or more system operations associated with the one or more issuer systems; and
sharing the reserve capacity with the one or more issuer systems.

8. A method, comprising:
determining, by one or more hardware processors, one or more declined transactions in a network;
identifying, by the one or more hardware processors, a plurality of anomalous transactions in the network based on the one or more declined transactions;
identifying, by the one or more hardware processors, one or more issuer systems associated with the plurality of anomalous transactions in the network;
modifying, by the one or more hardware processors, product-policy data of a product configuration engine for the one or more identified issuer systems based on the plurality of anomalous transactions;
receiving, by the one or more hardware processors via a merchant webpage, transaction data associated with a transaction request, wherein the transaction data comprises a header and a body;
modifying, by the one or more hardware processors, the header based on the modified product-policy data; and
transmitting, by the one or more hardware processors, the modified transaction data to an issuer system of the one or more issuer systems.

9. The method of claim 8, further comprising:
determining a token depletion rate associated with the one or more issuer systems based at least on the plurality of anomalous transactions; and
generating a plurality of tokens in a token database based at least on the token depletion rate.

10. The method of claim 9, wherein the plurality of tokens is associated with a first bin range, and wherein the method further comprises:
detecting a low token indication based at least on the token depletion rate;
provisioning a second bin range for a second plurality of tokens in response to the detecting the low token indication; and
generating the second plurality of tokens in the token database based on the second bin range.

11. The method of claim 8, further comprising:
detecting a low token indication based on the plurality of anomalous transactions; and
activating a bin range for a plurality of tokens based at least on the low token indication, wherein the modifying the product-policy data is further based on the activated bin range.

12. The method of claim 8, further comprising:
determining feedback data based at least on the learning the one or more system operations; and
determining an intermediate matrix that represents policy requirements in a binary form based at least on the feedback data, wherein the product-policy data is modified further using the intermediate matrix.

13. The method of claim 12, further comprising:
determining a first matrix associated with the product-policy data; and
generating a second matrix based on performing one or more matrix operations with the first matrix and the intermediate matrix, wherein the product-policy data is modified further based on the second matrix.

14. The method of claim 8, further comprising:
determining an operating capacity associated with processing transactions by a plurality of issuer systems;
determining a reserve capacity for the one or more issuer systems based at least on the learning the one or more system operations; and
sharing the reserve capacity with the one or more issuer systems.

15. A non-transitory machine-readable medium having stored thereon machine-readable instructions executable to cause a machine to perform operations comprising:
determining one or more declined transactions in a network;
identifying a plurality of anomalous transactions in the network based at least on the one or more declined transactions;
identifying one or more issuer systems associated with the plurality of anomalous transactions in the network;
modifying product-policy data for the one or more identified issuer systems based on the plurality of anomalous transactions;
receiving, via a merchant webpage, transaction data associated with a transaction request, wherein the transaction data comprises a header and a body;
modifying the header based on the modified product-policy data; and
transmitting the modified transaction data to an issuer system of the one or more issuer systems.

16. The non-transitory machine-readable medium of claim 15, wherein the operations further comprise:
determining a token depletion rate associated with the one or more issuer systems based at least on the plurality of anomalous transactions; and
generating a plurality of tokens in a token database based at least on the token depletion rate.

17. The non-transitory machine-readable medium of claim 16, wherein the plurality of tokens is associated with a first bin range, and wherein the operations further comprise:
detecting a low token indication based at least on the token depletion rate;
provisioning a second bin range for a second plurality of tokens in response to the detecting the low token indication; and
generating the second plurality of tokens in the token database based on the second bin range.

18. The non-transitory machine-readable medium of claim 15, wherein the operations further comprise:
detecting a low token indication based on the plurality of anomalous transactions; and
activating a bin range for a plurality of tokens based at least on the low token indication, wherein the modifying the product-policy data is further based on the activated bin range.

19. The non-transitory machine-readable medium of claim 15, wherein the operations further comprise:
determining feedback data based at least on the learning the one or more system operations; and
determining an intermediate matrix that represents policy requirements in a binary form based at least on the feedback data, wherein the product-policy data is modified further using the intermediate matrix.

20. The non-transitory machine-readable medium of claim 19, wherein the operations further comprise:
determining a first matrix associated with the product-policy data; and
generating a second matrix based on performing one or more matrix operations with the first matrix and the intermediate matrix wherein the product-policy data is modified further based on the second matrix.

* * * * *